(12) United States Patent
Suzuki et al.

(10) Patent No.: US 6,805,166 B2
(45) Date of Patent: Oct. 19, 2004

(54) BELLOWS-TYPE HYDRAULIC ACCUMULATOR

(75) Inventors: Kenichi Suzuki, Aichi-ken (JP); Yuichiro Sakakibara, Hekinan (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/395,267

(22) Filed: Mar. 25, 2003

(65) Prior Publication Data

US 2003/0178076 A1 Sep. 25, 2003

(30) Foreign Application Priority Data

Mar. 25, 2002 (JP) ......................................... 2002-082493

(51) Int. Cl.$^7$ ................................................ F16L 55/04
(52) U.S. Cl. ........................... 138/31; 138/30; 138/26; 220/721
(58) Field of Search ............................. 138/26, 30, 31; 303/87; 220/721

(56) References Cited

U.S. PATENT DOCUMENTS

| | | | | | |
|---|---|---|---|---|---|
| 2,450,031 | A | * | 9/1948 | Alexandre | ................... 138/31 |
| 3,336,948 | A | * | 8/1967 | Rene | ............................. 138/31 |
| 3,695,297 | A | * | 10/1972 | Ferrentino | .................... 138/30 |
| 4,527,580 | A | * | 7/1985 | Chheda | .......................... 137/1 |
| 4,997,009 | A | * | 3/1991 | Niikura et al. | ................. 138/30 |
| 6,286,552 | B1 | * | 9/2001 | Shimbori et al. | .............. 138/31 |

FOREIGN PATENT DOCUMENTS

| | | | |
|---|---|---|---|
| JP | 2000-249101 A | 9/2000 |
| JP | 2000-320501 A | 11/2000 |
| JP | 2000-356201 A | 12/2000 |
| WO | WO 01/34984 A2 | 5/2001 |

* cited by examiner

Primary Examiner—Patrick Brinson
(74) Attorney, Agent, or Firm—Burns, Doane, Swecker & Mathis, L.L.P.

(57) ABSTRACT

A bellows-type hydraulic accumulator includes a main shell defining a pressure space, and a bellows unit sectioning the pressure space into a gas chamber and a liquid chamber. An auxiliary shell is disposed inside the liquid chamber and fixed to the main shell. The auxiliary shell has an auxiliary liquid chamber communicating with a liquid port. A movable wall member is disposed in the auxiliary shell in order to section the interior of the auxiliary shell into a first interior portion communicating with the liquid port and a second interior portion communicating with the liquid chamber via a communication passage formed in the auxiliary shell.

15 Claims, 2 Drawing Sheets

BELLOWS-TYPE HYDRAULIC ACCUMULATOR

BACKGROUND OF THE INVENTION

1. Field of the Invention

The present invention relates to a hydraulic accumulator for accumulating pressurized liquid, and more particularly to a bellows-type hydraulic accumulator whose interior is sectioned into a gas chamber, in which pressurized gas is enclosed, and a liquid chamber communicating with the exterior, by means of a bellows.

2. Description of the Related Art

Accumulators of the above-described type are disclosed in, for example, Japanese Patent Application Laid-Open (kokai) Nos. 2000-356201, 2000-320501, and 2000-249101, and German Patent Publication No. DE19954326A1. In these conventional accumulators, a hydraulic accumulator structure is established by provision of a shell defining a pressure space, and a bellows sectioning the pressure space into a gas chamber in which pressurized gas is enclosed and a liquid chamber communicating with the exterior.

However, a potential problem in relation to the above-described conventional accumulators is that, when the bellows is broken, not only is the accumulator function itself lost, but also pressurized gas enclosed in the accumulator is prone to flow out of the accumulator into a hydraulic circuit in which the accumulator is employed.

SUMMARY OF THE INVENTION

In view of the foregoing problems with the conventional technology, an object of the present invention is to provide a bellows-type hydraulic accumulator which, even when bellows happen to be broken, is able to not only retain the accumulator function itself, but also prevent pressurized gas enclosed in a gas chamber from flowing out of the accumulator into a hydraulic circuit to which the accumulator is applied.

To achieve the above object, according to a first aspect of the present invention, there is provided a bellows-type hydraulic accumulator comprising: a main shell forming a pressure space; a bellows unit which is disposed in the pressure space and whose first end is fixedly secured to a first end wall of the main shell, the bellows unit sectioning the pressure space into an outer chamber serving as a gas chamber in which pressurized gas is enclosed, and an inner chamber serving as a main liquid chamber communicating with a liquid port formed in the first end wall of the main shell; an auxiliary shell disposed in the main liquid chamber and fixed to the main shell, the auxiliary shell having an auxiliary liquid chamber formed therein and communicating with the liquid port of the main shell; and a movable wall member disposed inside the auxiliary shell and sectioning the auxiliary liquid chamber into a first interior portion communicating with the liquid port and a second interior portion communicating with the main liquid chamber via a communication passage formed in the auxiliary shell.

According to a second aspect of the present invention, there is provided a bellows-type hydraulic accumulator comprising: a main shell defining a pressure space; a bellows unit which is disposed in the pressure space and whose first end is fixedly secured to a first end wall of the main shell, the bellows unit sectioning the pressure space into an inner chamber serving as a gas chamber in which pressurized gas is enclosed, and an outer chamber serving as a main liquid chamber communicating with a first liquid port formed in a second end wall of the main shell; an auxiliary shell disposed outside the main shell and fixed to the main shell, the auxiliary shell having an auxiliary liquid chamber formed therein and communicating with the first liquid port; and a movable wall member disposed inside the auxiliary shell and sectioning the auxiliary liquid chamber into first and second interior portions, the first interior portion communicating with a second liquid port that is formed in a bottom wall portion of the auxiliary shell opposite the main shell, the second interior portion communicating with the main liquid chamber via the first liquid port.

In the accumulators according to the first and second aspects of the present invention, a hydraulic accumulator structure is constituted by the main shell and the bellows unit; and another hydraulic accumulator structure is constituted by the main shell, the auxiliary shell, and the movable wall member. Therefore, even when the bellows breaks, not only does the accumulator itself retain its function, but also pressurized gas enclosed in the gas chamber of the accumulator can be prevented from accidentally flowing out of the accumulator (in other words, prevented from flowing into a hydraulic circuit in which the accumulator is employed).

The accumulator according to the first aspect of the present invention can be constructed compactly, because the auxiliary shell and the movable wall member are located within the bellows inside the main shell. The accumulator according to the second aspect of the present invention can be constructed by utilizing the existing shell and bellows structure as a base.

Preferably, in the accumulator according to the first aspect of the present invention, maximum and minimum volumes of the second interior portion are respectively set in such a manner that, when an amount of liquid corresponding to a difference between the maximum and minimum volumes is fed from the auxiliary liquid chamber into the main liquid chamber, a gap remains between a second end of the bellows unit, opposite the first end thereof, and a second end wall of the main shell, opposite the first end wall thereof, in order to avoid a possible impact therebetween and such that, when the above-mentioned amount of liquid is fed from the main liquid chamber into the auxiliary liquid chamber, a gap remains between the second end of the bellows unit and an end wall of the auxiliary shell in order to avoid a possible impact therebetween.

Preferably, in the accumulator according to the second aspect of the present invention, maximum and minimum volumes of the second interior portion are respectively set in such a manner that, when an amount of liquid corresponding to a difference between the maximum and minimum volumes is fed from the auxiliary liquid chamber into the main liquid chamber, a gap remains between a second end of the bellows unit, opposite the first end thereof, and the first end wall of the main shell, in order to avoid a possible impact therebetween and such that, when the above-mentioned amount of liquid is fed from the main liquid chamber into the auxiliary liquid chamber, a gap remains between the second end of the bellows unit and the second end wall of the main shell, opposite the first end wall thereof, in order to avoid a possible impact therebetween.

In these cases, the stroke of the bellows unit is determined by means of the amount of liquid permitted to flow into and out of the second interior portion; and an overstroke of the bellows unit can be restrained so as to avoid an impact between the second end of the bellows unit and an end wall opposing thereto, whereby effective protection of the bellows unit can be achieved.

In the accumulator according to the first aspect of the present invention, preferably, the auxiliary shell includes a tubular wall portion defining a cylinder bore, and a bottom wall portion serving as a partition between the cylinder bore and the main liquid chamber; and a hole serving as the communication passage is formed in the bottom wall portion. In this case, the auxiliary shell can be constructed simply and at low cost.

In the accumulator according to the first aspect of the present invention, more preferably, the auxiliary shell includes a tubular wall portion defining a cylinder bore, and a bottom wall portion serving as a partition between the cylinder bore and the main liquid chamber; the movable wall member is constituted by a piston that is fitted in the cylinder bore in a liquid-tight and slidable manner; and a hole serving as the communication passage is formed in the bottom wall portion. In this case, the auxiliary shell and the movable wall member (piston) can be constructed simply and at low cost.

Preferably, a stroke of the piston is limited by the bottom wall portion of the auxiliary shell and the first end wall of the main shell. In this case, the stroke of the piston can be limited by the bottom wall portion of the auxiliary shell and the first end wall of the main shell, and the sliding movement of the piston can be precisely restrained by means of a mechanical stopper (the auxiliary shell's bottom wall portion and the main shell's first end wall) at either the low-pressure side or the high-pressure side.

Preferably, the bellows unit includes a bellows and a movable plate connected with an end of the bellows corresponding to the second end of the bellows unit; and the accumulator further comprises an annular sealing member mounted on at least one of opposing surfaces of the movable plate and the bottom wall portion of the auxiliary shell and adapted to be brought into and out of liquid-tight contact with the other of the opposing surfaces when the movable plate is moved toward and away from the bottom wall portion of the auxiliary shell, whereby the hole in the bottom wall portion of the auxiliary shell is separated from and communicated with the main liquid chamber and vice versa.

When the pressure of the main liquid chamber between the bellows and the auxiliary shell is lowered as a result of failure of the movable wall member in sectioning the interior of the auxiliary shell, the annular sealing member isolates the main liquid chamber from the hole formed in the bottom wall portion of the auxiliary shell (shuts off the communication passage between the main liquid chamber and the hole of the bottom wall portion of the auxiliary shell), to thereby prevent overcontraction (overcollapse) of the bellows.

Preferably, the piston assumes a bottomed tubular shape. In this case, the piston can be reduced in weight while securing the necessary length of the outer-circumferential-surface guide.

Preferably the bellows of the bellows unit is metallic. In this case, liquid pressurized at high pressure can be accumulated in the main liquid chamber.

BRIEF DESCRIPTION OF THE DRAWINGS

Various other objects, features, and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
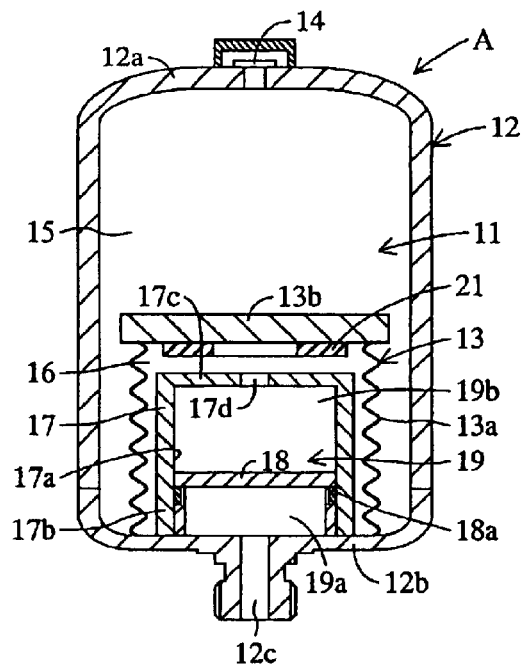
FIG. 1 is a cross-sectional view of a bellows-type hydraulic accumulator according to a first embodiment of the present invention.
Figure 2:
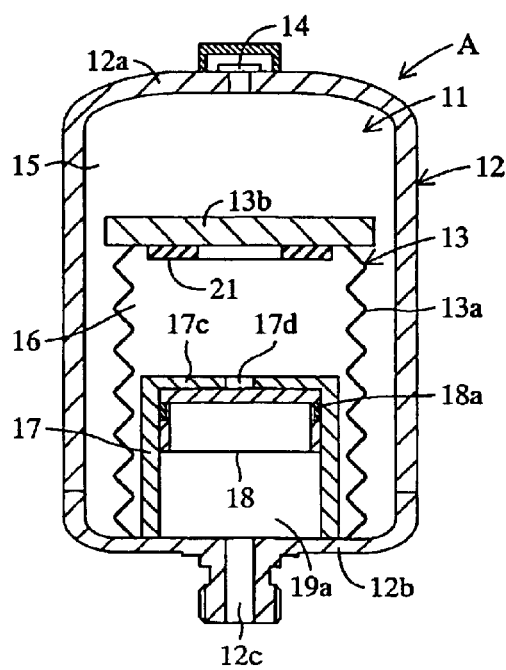
FIG. 2 is a cross-sectional view showing an operated state (liquid accumulated state) of the accumulator of FIG. 1.

Embodiments of the present invention will now be described with reference to the drawings. FIGS. 1 and 2 show a bellows-type hydraulic accumulator (hereinafter also called an accumulator) according to a first embodiment of the present invention. The accumulator A includes a main shell 12 defining a pressure space 11, and a bellows unit 13 disposed within the pressure space 11. The main shell 12 is constituted by upper and lower shell halves, which are joined together in a liquid-tight state. A plug 14 is fitted in an airtight manner in an unnumbered gas filling port formed in an upper end wall 12a of the main shell 12.

The bellows unit 13 is constituted by a cylindrical, tubular metallic bellows 13a and a metallic movable plate 13b which is connected in an airtight and liquid-tight state to an upper end of the bellows 13a. A lower end of the bellows 13a is fixed in an airtight and liquid-tight manner to a lower end wall 12b of the main shell 12. Thus, the pressure space 11 is sectioned into an outer chamber serving as a gas chamber 15 in which predetermined pressurized gas is enclosed, and an inner chamber serving as a main liquid chamber 16 communicating with a liquid port 12c formed in the lower end wall 12b of the main shell 12. Located inside the bellows unit 13; namely, inside the main liquid chamber 16, are an auxiliary shell 17 and a piston 18.

The auxiliary shell 17 has a cylindrical, tubular wall portion 17b defining a cylinder bore 17a, and a bottom wall portion 17c being continuous with the upper end of the cylindrical, tubular wall portion 17b and serving as a partition between the cylinder bore 17a and the main liquid chamber 16. A hole 17d serving as a communication passage is formed in the bottom wall portion 17c. The lower end of the auxiliary shell 17 is fixed in a liquid-tight manner to the lower end wall 12b of the main shell 12, whereby an auxiliary liquid chamber 19 communicating with the liquid port 12c is formed inside the auxiliary shell 17.

The piston 18 serves as a movable wall member which sections the interior (the auxiliary liquid chamber 19) of the auxiliary shell 17 into a first interior portion 19a communicating with the liquid port 12c, and a second interior portion 19b communicating with the main liquid chamber 16 via the hole (communication passage) 17d of the auxiliary shell 17. The piston 18 assumes a bottomed cylindrical, tubular shape. A sealing ring 18a is fitted into a circumferential groove formed on the circumference of the piston 18, and hence the piston 18 is fitted in a liquid-tight and slidable manner in the cylinder bore 17a. Further, the piston 18 is constructed in such a manner that upward movement of the piston 18 is limited through abutment against the bottom wall portion 17c of the auxiliary shell 17 (the state shown in FIG. 2), whereas downward movement of the piston 18 is limited through abutment against the lower end wall 12b of the main shell 12 (the state shown in FIG. 1).

Further, in the present embodiment, liquid is enclosed in the main liquid chamber 16 located between the bellows unit 13 and the auxiliary shell 17, as well as in the second portion 19b of the auxiliary liquid chamber 19. Maximum and minimum volumes (the volume in the state of FIG. 1 and the volume in the state of FIG. 2, respectively) of the second portion 19b of the auxiliary liquid chamber 19 are respectively set in such a manner that, when an amount of liquid Q corresponding to a difference between the maximum volume and the minimum volume is fed from the auxiliary chamber 19 into the main liquid chamber 16, a gap remains between the movable plate 13b of the bellows unit 13 and the upper end wall 12a of the main shell 12, as shown in FIG. 2, in order to avoid a possible impact therebetween; and that, when the above-described amount of liquid Q is fed from the main liquid chamber 16 into the auxiliary liquid chamber 19, a gap remains between the movable plate 13b of the bellows unit 13 and the bottom wall portion 17c of the auxiliary shell 17, as shown in FIG. 1, in order to avoid a possible impact therebetween.

Still further, in the present embodiment, an annular sealing member 21 is carried by a lower surface of the movable plate 13b of the bellows unit 13, which surface faces the bottom wall portion 17c of the auxiliary shell 17. When the movable plate 13b is moved toward and away from the auxiliary shell 17, the annular sealing member 21 comes into and out of liquid-tight contact with the bottom wall portion 17c of the auxiliary shell 17, whereby the hole 17d in the bottom wall portion 17c of the auxiliary shell 17 is separated from and brought into communication with the main liquid chamber 16 and vice versa.

In the case in which the thus-constructed accumulator A of the present embodiment is used with a hydraulic circuit (e.g., a hydraulic brake system for a vehicle), the liquid port 12c of the main shell 12 is connected to the hydraulic circuit (e.g., piping of the hydraulic brake system). When the pressure of the hydraulic circuit increases, the state of the accumulator A changes from the state of FIG. 1 to the state of FIG. 2, so that pressurized liquid flowing from the hydraulic circuit is accumulated in the first interior portion 19a of the auxiliary liquid chamber 19. Conversely, when the pressure of the hydraulic circuit drops, the state the accumulator A changes from the state of FIG. 2 to the state of FIG. 1, so that the pressurized liquid accumulated in the first interior portion 19a of the auxiliary liquid chamber 19 is returned to the hydraulic circuit.

In other words, while the state of the accumulator A changes from the state of FIG. 1 to the state of FIG. 2, liquid flows from the second interior portion 19b of the auxiliary liquid chamber 19 into the main liquid chamber 16 between the bellows unit 13 and the auxiliary shell 17 via the hole 17d. Conversely, while the state of the accumulator A changes from the state of FIG. 2 to the state of FIG. 1, liquid flows from the main liquid chamber 16 between the bellows unit 13 and the auxiliary shell 17 into the second interior portion 19b of the auxiliary chamber 19 via the hole 17d.

In the accumulator A of the present embodiment, a hydraulic accumulator structure is constituted by the main shell 12 and the bellows unit 13, and another hydraulic accumulator structure is constituted by the main shell 12, the auxiliary shell 17, and the piston 18. Therefore, even if the bellows unit 13 happens to be broken, not only can the accumulator retain its function, but also pressurized gas enclosed in the gas chamber 15 of the accumulator A can be prevented from flowing out of the accumulator (prevented from flowing into the unillustrated hydraulic circuit, in other words).

Further, because the auxiliary shell 17 and the piston 18 are disposed in the bellows unit 13 inside the main shell 12, the accumulator A can be constructed compactly. Furthermore, because the extent of stroke of the bellows unit 13 is defined by means of the amount of liquid Q permitted to flow into and out of the second interior portion 19b of the auxiliary liquid chamber 19, an overstroke of the bellows unit 13 can be restrained in such a manner as to avoid an impact between the movable plate 13b of the bellows unit 13 and the upper end wall 12a of the main shell 12, or the bottom wall portion 17c of the auxiliary shell 17, thereby protecting the bellows unit 13 effectively.

Still further, in the accumulator A, the auxiliary shell 17 is configured to have the tubular wall portion 17b defining the cylinder bore 17a, and the bottom wall portion 17c serving as a partition between the cylinder bore 17a and the main liquid chamber 16; and the movable wall member for sectioning the auxiliary liquid chamber 19 into the first and second interior portions 19a and 19b is constituted by the piston 18, which is fitted in the cylinder bore 17a in a liquid-tight and slidable manner. Therefore, both the auxiliary shell 17 and the movable wall member (piston 18) can be constructed simply and at low cost.

Moreover, the stroke of the piston 18 can be limited by the bottom wall portion 17c of the auxiliary shell 17 and the lower end wall 12b of the main shell 12; that is, the sliding movement of the piston 18 toward either the low pressure side (in the state shown in FIG. 1) or the high pressure side (in the state shown in FIG. 2) can be restricted reliably by means of a mechanical stopper (i.e., the bottom wall portion 17c of the auxiliary 17 or the lower end wall 12b of the main shell 12).

In addition, in the accumulator A, when the pressure of the main liquid chamber 16 between the bellows unit 13 and the auxiliary shell 17 drops in response to failure of the piston 18 in sectioning the interior of the auxiliary shell 17 (e.g., when the sealing ring 18a looses its sealing function), the annular sealing member 21 serves to isolate the main liquid chamber 16 from the hole 17d formed in the bottom wall portion 17c of the auxiliary shell 17 (shut off the communication passage between the main liquid chamber 16 and the hole 17d of the bottom wall portion 17c of the auxiliary shell 17), thereby preventing overcontraction (overcollapse) of the bellows unit 13.

Further, in the accumulator A, because the piston 18 assumes a bottomed cylindrical, tubular shape, the piston 18 can be reduced in weight while securing a necessary circumferential guide length. Still further, since the bellows 13a of the bellows unit 13 is metallic, a highly pressurized liquid can be accumulated in the main liquid chamber 16.

In the above-described accumulator A according the first embodiment of the present invention, as shown in FIGS. 1 and 2, the auxiliary shell 17 and the piston 18 in the bellows unit 13 are disposed inside the main shell 12; however, the present invention should by no means be limited to this example. For example, in an accumulator B according to a second embodiment of the present invention shown in FIGS. 3 and 4, an auxiliary shell 117 and a piston 118 are disposed outside a main shell 112.

Figure 3:
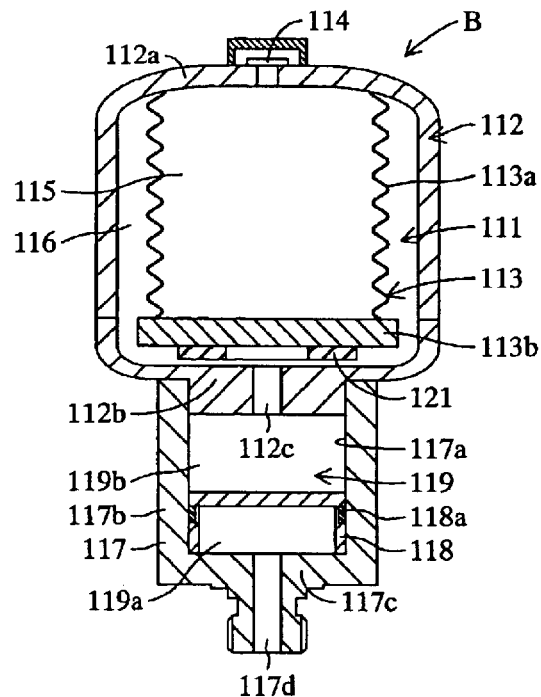
FIG. 3 is a cross-sectional view of a bellows-type hydraulic accumulator according to a second embodiment of the present invention.
Figure 4:
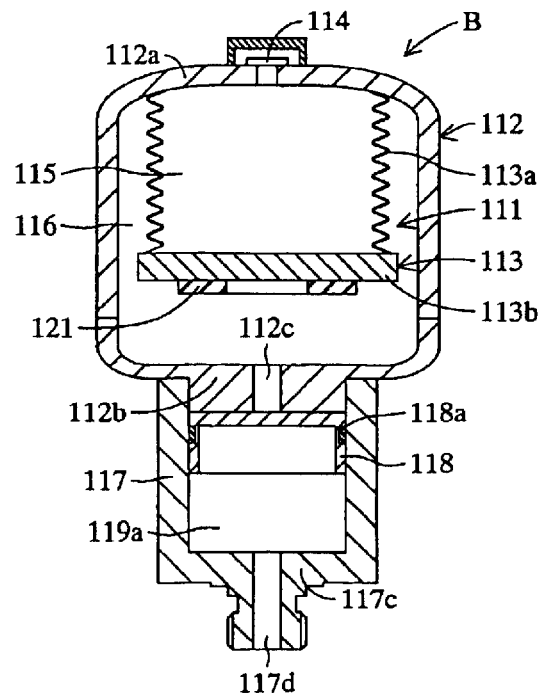
FIG. 4 is a cross-sectional view showing an operated state (liquid accumulated state) of the accumulator of FIG. 3.

In the accumulator B shown in FIGS. 3 and 4, a bellows unit 113 located in a pressure space 111 of the main shell 112 is constituted by a cylindrical, tubular metallic bellows 113a and a metallic movable plate 113b that is connected to a lower end of the bellows 113a in an airtight and liquid-tight manner. An upper end of the bellows 113a is fixedly secured to an upper end wall 112a of the main shell 112 in an airtight and liquid-tight manner, thereby sectioning the pressure space 111 into an inner chamber serving as a gas chamber 115 in which predetermined pressurized gas is enclosed, and an outer chamber serving as a main liquid chamber 116 communicating with a liquid port 112c defined in a lower end wall 112b of the main shell 112.

Further, the auxiliary shell 117, which defines an auxiliary liquid chamber 119 communicating with the liquid port 112c, is disposed outside the main shell 112 and is fixed to the main shell 112 in a liquid-tight manner. A piston 118 is disposed in the auxiliary shell 117 in order to section the interior of the auxiliary shell 117 into first and second interior portions 119a and 119b: the first interior portion 119a communicates with a second liquid port 117d formed in a bottom wall portion 117c of the auxiliary shell 117 opposite the main shell 112; and the second interior portion 119b communicates with the main liquid chamber 116 via the first liquid port 112c of the main shell 112. The piston 118 is fitted in a liquid-tight and slidable manner in a cylinder bore 117a defined by a cylindrical, tubular wall portion 117b of the auxiliary shell 117.

Because the auxiliary shell 117 is located outside the main shell 112 and the piston 118 serving as a movable wall member is located inside the auxiliary shell 117, the accumulator B can be constructed utilizing the existing structures of the main shell 112 and bellows unit 113 as a base.

Moreover, like in the accumulator A of the first embodiment, in the accumulator B, a plug 114 is fitted in an airtight manner in an unnumbered gas filling port formed in the main shell 112; a sealing ring 118a is fitted to the piston 118; and an annular sealing member 121 is carried by the movable plate 113b of the bellows unit 113. Therefore, in the accumulator B, substantially the same results as yielded in the accumulator A of the first embodiment can be expected.

In each of the above-described embodiments, the piston 18 or 118 is employed as a movable wall member; however, the movable wall member may assume an alternative form, such as a bellows or a diaphragm. Further, in each of the above-described embodiments, the auxiliary shell 17 or 117 assumes the shape of a cylindrical tube; alternatively, the auxiliary shell 17 or 117 may assume the shape of a tube having a square cross section. Furthermore, in each of the above-described embodiments, the annular sealing member 21 or 121 is carried by the movable plate 13b or 113b of the bellows unit 13 or 113; alternatively, the annular sealing member 21 or 121 may be carried by the bottom wall portion 17c of the auxiliary shell 17 or the lower end wall 112b of the main shell 112, either of which is disposed in confronting relation with the movable plate 13 or 113.

As is understood from the foregoing description, the present invention should by no means be limited to the illustrated examples, and various modifications may be suggested without departing from the gist and scope of the invention.

What is claimed is:

1. A bellows-type hydraulic accumulator comprising:
   a main shell forming a pressure space;
   a bellows unit which is disposed in the pressure space and whose first end is fixedly secured to a first end wall of the main shell, the bellows unit sectioning the pressure space into an outer chamber serving as a gas chamber in which pressurized gas is enclosed, and an inner chamber serving as a main liquid chamber;
   an auxiliary shell disposed in the main liquid chamber and fixed to the main shell, the auxiliary shell having an auxiliary liquid chamber formed therein and communicating with a liquid port formed in the first end wall of the main shell; and
   a movable wall member disposed inside the auxiliary shell in a liquid-tight and slidable manner and sectioning the auxiliary liquid chamber into a first interior portion communicating with the liquid port and a second interior portion communicating with the main liquid chamber via a communication passage formed in the auxiliary shell.

2. A bellows-type hydraulic accumulator comprising:
   a main shell defining a pressure space;
   a bellows unit which is disposed in the pressure space and whose first end is fixedly secured to a first end wall of the main shell, the bellows unit sectioning the pressure space into an inner chamber serving as a gas chamber in which pressurized gas is enclosed, and an outer chamber serving as a main liquid chamber communicating with a first liquid port formed in a second end wall of the main shell;
   an auxiliary shell disposed outside the main shell and fixed to the main shell, the auxiliary shell having an auxiliary liquid chamber formed therein and communicating with the first liquid port; and
   a movable wall member disposed inside the auxiliary shell in a liquid-tight and slidable manner and sectioning the auxiliary liquid chamber into first and second interior portions, the first interior portion communicating with a second liquid port that is formed in a bottom wall portion of the auxiliary shell opposite the main shell, the second interior portion communicating with the main liquid chamber via the first liquid port.

3. A bellows-type hydraulic accumulator according to claim 1, wherein maximum and minimum volumes of the second interior portion are respectively set in such a manner that, when an amount of liquid corresponding to a difference between the maximum and minimum volumes is fed from the auxiliary liquid chamber into the main liquid chamber, a gap remains between a second end of the bellows unit, opposite the first end thereof, and a second end wall of the main shell, opposite the first end wall thereof, in order to avoid a possible impact therebetween and such that, when the amount of liquid is fed from the main liquid chamber into the auxiliary liquid chamber, a gap remains between the second end of the bellows unit and an end wall of the auxiliary shell in order to avoid a possible impact therebetween.

4. A bellows-type hydraulic accumulator according to claim 2, wherein maximum and minimum volumes of the second interior portion are respectively set in such a manner that, when an amount of liquid corresponding to a difference between the maximum and minimum volumes is fed from the auxiliary liquid chamber into the main liquid chamber, a gap remains between a second end of the bellows unit, opposite the first end thereof, and the first end wall of the main shell, in order to avoid a possible impact therebetween and such that, when the amount of liquid is fed from the main liquid chamber into the auxiliary liquid chamber, a gap remains between the second end of the bellows unit and the second end wall of the main shell, opposite the first end wall thereof, in order to avoid a possible impact therebetween.

5. A bellows-type hydraulic accumulator according to claim 1, wherein the auxiliary shell includes a tubular wall portion defining a cylinder bore, and a bottom wall portion serving as a partition between the cylinder bore and the main liquid chamber; and a hole serving as the communication passage is formed in the bottom wall portion.

6. A bellows-type hydraulic accumulator according to claim 1, wherein the auxiliary shell includes a tubular wall portion defining a cylinder bore, and a bottom wall portion serving as a partition between the cylinder bore and the main liquid chamber; the movable wall member is constituted by a piston that is fitted in the cylinder bore in a liquid-tight and slidable manner; and a hole serving as the communication passage is formed in the bottom wall portion.

7. A bellows-type hydraulic accumulator according to claim 6, wherein a stroke of the piston is limited by the bottom wall portion of the auxiliary shell and the first end wall of the main shell.

8. A bellows-type hydraulic accumulator according to claim 5, wherein the bellows unit includes a bellows and a movable plate connected with an end of the bellows corresponding to the second end of the bellows unit; and the accumulator further comprises an annular sealing member mounted on at least one of opposing surfaces of the movable plate and the bottom wall portion of the auxiliary shell and adapted to be brought into and out of liquid-tight contact with the other of the opposing surfaces when the movable plate is moved toward and away from the bottom wall portion of the auxiliary shell, whereby the hole in the bottom wall portion of the auxiliary shell is separated from and communicated with the main liquid chamber and vice versa.

9. A bellows-type hydraulic accumulator according to claim 6, wherein the bellows unit includes a bellows and a movable plate connected with an end of the bellows corresponding to the second end of the bellows unit; and the accumulator further comprises an annular sealing member mounted on at least one of opposing surfaces of the movable plate and the bottom wall portion of the auxiliary shell and adapted to be brought into and out of liquid-tight contact with the other of the opposing surfaces when the movable plate is moved toward and away from the bottom wall portion of the auxiliary shell, whereby the hole in the bottom wall portion of the auxiliary shell is separated from and communicated with the main liquid chamber and vice versa.

10. A bellows-type hydraulic accumulator according to claim 7, wherein the bellows unit includes a bellows and a movable plate connected with an end of the bellows corresponding to the second end of the bellows unit; and the accumulator further comprises an annular sealing member mounted on at least one of opposing surfaces of the movable plate and the bottom wall portion of the auxiliary shell and adapted to be brought into and out of liquid-tight contact with the other of the opposing surfaces when the movable plate is moved toward and away from the bottom wall portion of the auxiliary shell, whereby the hole in the bottom wall portion of the auxiliary shell is separated from and communicated with the main liquid chamber and vice versa.

11. A bellows-type hydraulic accumulator according to claim 6, wherein the piston assumes a bottomed tubular shape.

12. A bellows-type hydraulic accumulator according to claim 7, wherein the piston assumes a bottomed tubular shape.

13. A bellows-type hydraulic accumulator according to claim 8, wherein the piston assumes a bottomed tubular shape.

14. A bellows-type hydraulic accumulator according to claim 9, wherein the piston assumes a bottomed tubular shape.

15. A bellows-type hydraulic accumulator according to claim 10, wherein the bellows of the bellows unit is metallic.

* * * * *